United States Patent
Son et al.

(10) Patent No.: US 10,062,138 B2
(45) Date of Patent: Aug. 28, 2018

(54) RENDERING APPARATUS AND METHOD

(71) Applicant: SAMSUNG ELECTRONICS CO., LTD., Suwon-si (KR)

(72) Inventors: Minyoung Son, Hwaseong-si (KR);
Minkyu Jeong, Yongin-si (KR);
Donghoon Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 15/158,002

(22) Filed: May 18, 2016

(65) Prior Publication Data

US 2017/0076418 A1  Mar. 16, 2017

(30) Foreign Application Priority Data

Sep. 11, 2015  (KR) .................. 10-2015-0129092

(51) Int. Cl.
*G06T 1/20* (2006.01)
*G09G 5/36* (2006.01)
*G06T 15/00* (2011.01)

(52) U.S. Cl.
CPC .............. *G06T 1/20* (2013.01); *G06T 15/005* (2013.01); *G09G 5/363* (2013.01); *G06T 2207/20016* (2013.01); *G09G 2360/122* (2013.01)

(58) Field of Classification Search
CPC ......... G06T 15/005; G06T 1/20; G06T 15/00; G06T 2207/20016; G09G 5/363; G09G 2360/12; G09G 2360/122
See application file for complete search history.

(56) References Cited

U.S. PATENT DOCUMENTS

| | | |
|---|---|---|
| 5,969,726 A | 10/1999 | Rentschler et al. |
| 6,266,149 B1 | 7/2001 | Zandee |
| 7,999,815 B1 | 8/2011 | Riach et al. |
| 2003/0123089 A1 | 7/2003 | Doyle |
| 2004/0160450 A1 | 8/2004 | Doyle |
| 2007/0195100 A1* | 8/2007 | Brown ............... G06T 15/005 345/502 |
| 2010/0020087 A1 | 1/2010 | Elmieh et al. |
| 2015/0116744 A1 | 4/2015 | Bouche et al. |
| 2015/0294436 A1 | 10/2015 | Jin et al. |

FOREIGN PATENT DOCUMENTS

KR  10-2015-0117522 A  10/2015

* cited by examiner

*Primary Examiner* — Hau H Nguyen
(74) *Attorney, Agent, or Firm* — F. Chau & Associates, LLC

(57) ABSTRACT

Provided are apparatuses and methods for rendering. The methods analyze draw commands and graphics states, generate hierarchical graphics states from the graphics states based on a graphics state common to the draw commands, and perform rendering of an image frame based on the hierarchical graphics states. The apparatuses use a hierarchical state generator and a graphics processing unit (GPU) to perform the rendering method.

19 Claims, 12 Drawing Sheets

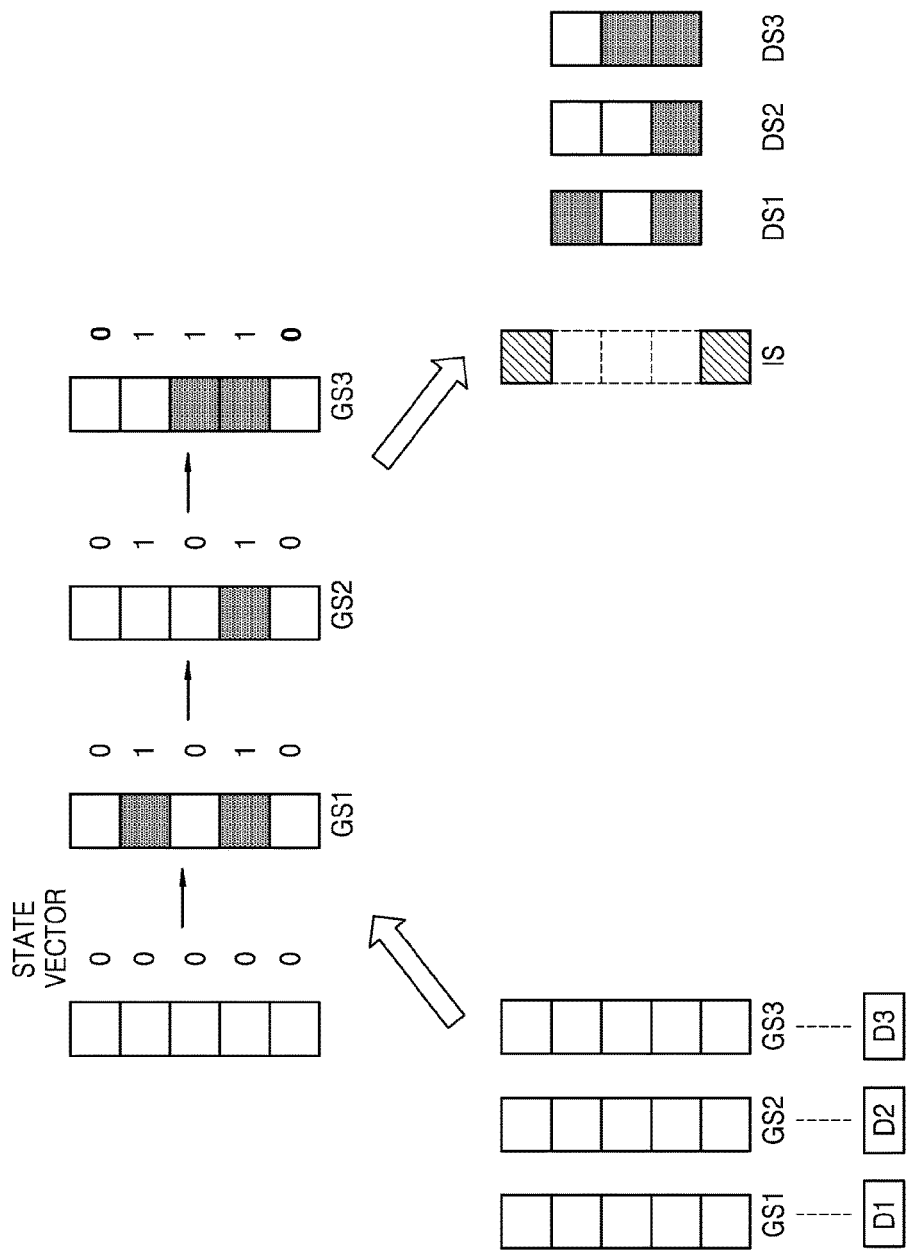

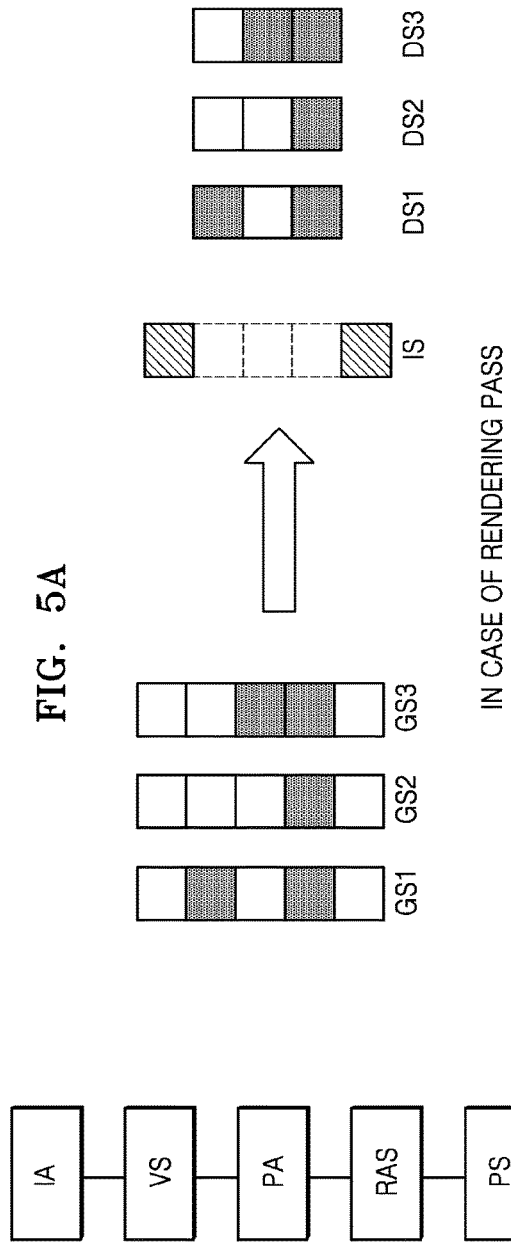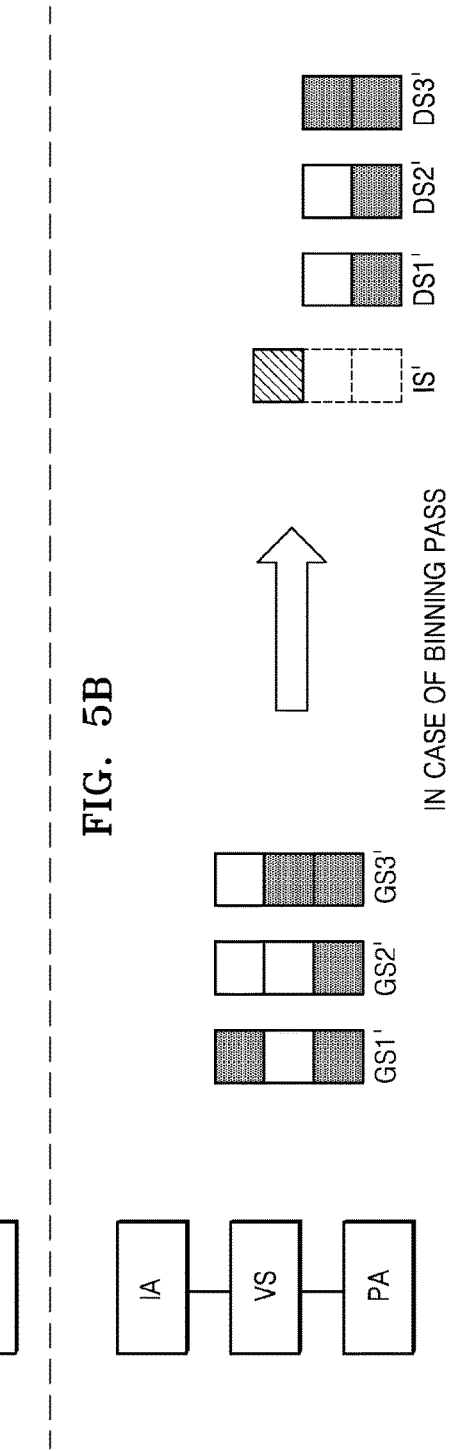

RENDERING APPARATUS AND METHOD

CROSS-REFERENCE TO RELATED APPLICATION(S)

This application claims the benefit under 35 USC 119(a) of Korean Patent Application No. 10-2015-0129092 filed on Sep. 11, 2015 in the Korean Intellectual Property Office, the entire disclosure of which is incorporated by reference for all purposes.

BACKGROUND

1. Field

The following description relates to rendering apparatuses and methods of generating and using hierarchical graphics states.

2. Description of Related Art

Three-dimensional (3D) rendering generally refers to image processing to synthesize 3D object data into an image as seen from a given camera viewpoint.

One example of the rendering methods may be a rasterization rendering scheme that generates images by projecting 3D objects onto an image screen. Another example rendering method may be a ray tracing rendering scheme that generates images by tracing a path of light incident along light rays directed toward pixels in an image from a given camera viewpoint.

Rendering apparatuses perform rendering of objects in response to draw commands by processing graphics states.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rendering apparatus includes a hierarchical state generator configured to analyze draw commands and graphics states for rendering at least one image frame, and to generate hierarchical graphics states from the graphics states based on a graphics state common to the draw commands, and a graphics processing unit (GPU) configured to render the at least one image frame based on the hierarchical graphics states.

The hierarchical graphics states may include an image state that is the graphics state common to the draw commands, and draw states determined based on the image state, corresponding to respective draw commands of the draw commands.

The GPU may include a state manager configured to set the image state and the draw states to be used by a graphics pipeline, wherein the graphics pipeline may be configured to render the at least one image frame based on the image state and the draw states set by the state manager.

The state manager may set the draw states to be used sequentially by the graphics pipeline after setting the image state to be used by the graphics pipeline.

The GPU may include a tile binner configured to divide the at least one image frame into tiles and to generate binning information representing which tiles among the tiles correspond to each of the draw states, a state manager configured to determine a graphics state contained commonly in draw states corresponding to a predetermined tile as a tile state based on the binning information, and a graphics pipeline configured to render the predetermined tile based on the hierarchical graphics states and the tile state.

The state manager may be configured to determine tile draw states respectively corresponding to the draw states corresponding to the predetermined tile, based on the tile state, and to set the image state, the tile state, and the tile draw states to be used by the graphics pipeline.

The state manager may be configured to set the tile draw states to be used sequentially by the graphics pipeline after sequentially setting the image state and the tile state to be used by the graphics pipeline.

The hierarchical state generator may be configured to generate the hierarchical graphics states for every rendering pass, in response to performing multi-pass rendering, and the GPU may be configured to perform the multi-pass rendering of the at least one image frame based on the hierarchical graphics states generated for each rendering pass.

The hierarchical state generator may be configured to provide the GPU with the hierarchical graphics states by using a state vector.

In another general aspect, a rendering method includes analyzing draw commands and graphics states for rendering at least one image frame, and generating hierarchical graphics states from the graphics states based on a graphics state common to the draw commands, and rendering the at least one image frame based on the hierarchical graphics states.

The hierarchical graphics states may include an image state that is the graphics state common to the draw commands, and draw states determined based on the image state, corresponding to respective draw commands of the draw commands.

The rendering may include setting the image state and the draw states to be used by a graphics pipeline, and rendering the at least one image frame based on the image state and the draw states.

The setting may include setting the draw states to be used sequentially by the graphics pipeline after setting the image state to be used by the graphics pipeline.

The rendering may include dividing the at least one image frame into tiles and generating binning information representing which tiles among the tiles correspond to each of the draw states, determining a graphics state contained commonly in draw states corresponding to a predetermined tile as a tile state based on the binning information, and rendering the predetermined tile based on the hierarchical graphics states and the tile state.

The rendering of the predetermined tile may include determining tile draw states, based on the tile state, respectively corresponding to the draw states corresponding to the predetermined tile, setting the image state, the tile state, and the tile draw states to be used by the graphics pipeline, and rendering the predetermined tile based on the set image state, the set tile state, and the set tile draw states.

The setting the image state, the tile state, and the tile draw states to the graphics pipeline may include setting the tile draw states to be used sequentially by the graphics pipeline after sequentially setting the image state and the tile state to be used by the graphics pipeline.

The generating the hierarchical graphics states may include generating the hierarchical graphics states for every rendering pass to perform multi-pass rendering, and the rendering may include performing the multi-pass rendering of the at least one image frame based on the hierarchical graphics states generated for each pass.

In another general aspect, a non-transitory computer-readable storage medium stores instructions for causing a processor/computer to perform the method described above.

Other features and aspects will be apparent from the following detailed description, the drawings, and the claims.

BRIEF DESCRIPTION OF THE DRAWINGS

FIG. 4 illustrates an embodiment of generating hierarchical graphics states, performed by a hierarchical state generator.

FIGS. 5A-5B illustrate an embodiment of generating the hierarchical graphics states, performed by a hierarchical state generator, for each pass to perform multi-pass rendering.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
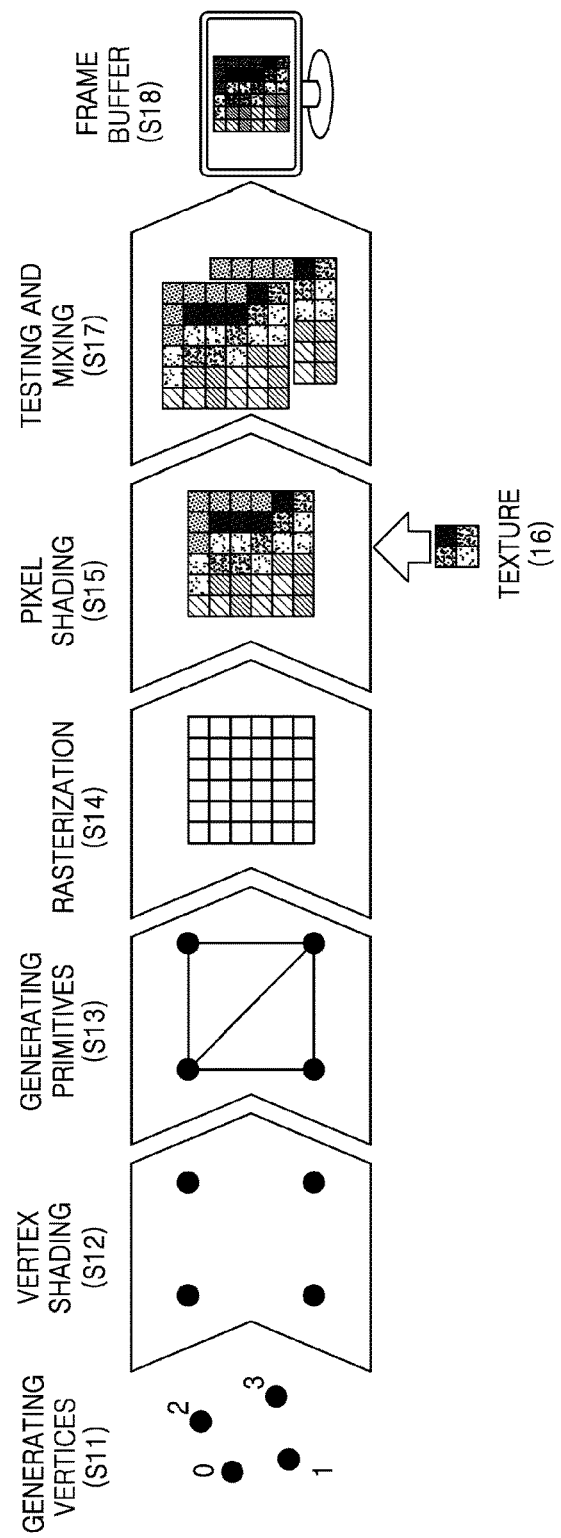
FIG. 1 illustrates a rendering process of a three-dimensional (3D) image, performed by a rendering apparatus, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Reference is now made in further detail to embodiments, examples of which are illustrated in the accompanying drawings, wherein like reference numerals refer to like elements throughout. In this regard, the embodiments described below are presented as possible examples, and are not to be construed as limiting. It should be noted that various changes, modifications, and equivalents of the apparatuses and methods apparent to one of ordinary skill in the art are within the scope of the embodiments.

The expressions "~comprises," "~includes," "~constructed," "~configured" are not to be construed as being equipped with all the components, processing steps, or operations described in this specification, but alternatively some of the components, the processing steps, or the operations are potentially not included and additional elements are optionally further included. Terminologies such as "~unit" and "~module" refer to entities performing at least one function or operation, and are potentially implemented by hardware.

The terminologies including ordinals such as "first" and "second" used to explain various elements in this specification may be used to discriminate an element from the other ones or for simplicity.

Embodiments are now presented in further detail with reference to the attached drawings to enable those skilled in the art to make and use the disclosure. However, the embodiments may have different forms and should not be construed as being limited to the descriptions set forth herein.

Provided are apparatuses and methods of generating and using hierarchical graphics states.

The use of hierarchical graphics states including the plurality of draw states and the image state common to the plurality of draw commands enables reduction of memory overhead caused by the transmission of the graphics states to a memory of the GPU and the overhead occurring in setting and maintaining the graphics states to the graphics pipeline.

FIG. 1 illustrates a rendering process of a three-dimensional (3D) image performed by a rendering apparatus according to an embodiment. In the example of FIG. 1, the rendering process includes operations S11 through S18.

In operation S11, vertices are generated. The vertices are generated to represent objects included in an image. In an embodiment, operation S11 is performed by an input assembly of a graphics pipeline.

In operation S12, shading is performed on the vertices. A vertex shader of a graphics pipeline performs shading on the vertices by assigning colors to the vertices generated in operation S11.

In operation S13, primitives are generated. The term primitive refers to a polygon that is formed of points, lines, or vertices. For example, the primitives are triangles formed by connecting three vertices. For example, operation S13 is performed by a primitive assembly of the graphics pipeline.

In operation S14, the primitives are rasterized. Rasterization of the primitives includes dividing of the primitives into a plurality of fragments. The term fragment refers to a portion of the primitives and is used as a basic unit for performing image processing. Because the primitive includes only information about vertices, interpolation is carried out to generate the fragments from the vertices during the rasterization operation. For example, operation S14 may be performed by a rasterizer of the graphics pipeline.

In operation S15, pixels are shaded. Although it may be understood from the example of FIG. 1 that the shading is performed in a unit of a pixel, the shading is also alternatively performed in a unit of a fragment. For example, the shading of pixels or fragments includes assignment of colors to the pixels or the fragments. Operation S15 is performed by a pixel shader of the graphics pipeline.

In operation S16, the pixels or the fragments are textured. Texturing is a method of using a previously generated image to add textures or colors to the pixels or the fragments. In the example of designating colors to one fragment, the shading operation performs the color designation by performing computations. By contrast, the texturing operation performs the designation by assigning to each pixel in the fragment the same color as that of a corresponding point in the previously generated image, after mapping points of the fragment to respective points of the previously generated image.

In operation S17, testing and mixing are performed. In operation S18, an image frame that is stored in a frame buffer is displayed. In this example, the image frame generated through operations S11 through S17 is stored in the frame buffer. The image frame stored in the frame buffer is then displayed on a display device.

Figure 2:
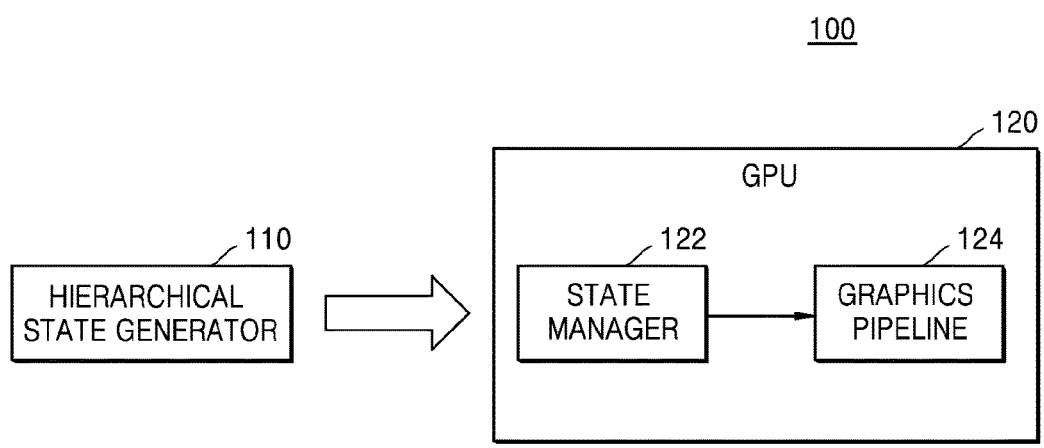
FIG. 2 is a block diagram of a rendering apparatus according to an embodiment.

FIG. 2 illustrates a rendering apparatus 100 according to an embodiment.

According to the embodiment of FIG. 2, the rendering apparatus 100 includes a hierarchical state generator 110 and a graphics processing unit (GPU) 120. Although FIG. 1 shows only the elements that are present in the embodiments, those skilled in the art would appreciate that the rendering apparatus 100 optionally includes other appropriate functional elements.

According to an embodiment, the hierarchical state generator 110 analyzes a plurality of draw commands and a plurality of graphics states for rendering one or more image frames, and generates hierarchical graphics states based on at least one graphics state that is common to the plurality of draw commands. According to another embodiment, the hierarchical state generator 110 generates the hierarchical graphics states based on a plurality of draw commands and a plurality of graphics states generated by a device driver. For example, the hierarchical state generator 110 includes the device driver.

According to an embodiment, the hierarchical state generator 110 generates the plurality of draw commands and the plurality of graphics states for rendering the image frames. Specifically, the hierarchical state generator 110 analyzes a graphics application program interface or graphics API received from an application to generate the draw commands and the graphics states that are to be processed by the GPU 120. Here, a draw command is a command that specifies one or more objects to be rendered in a certain frame. In an embodiment, the draw command is expressed as a draw call. For example, the draw command is a command for drawing a certain number of triangles or rectangles in one or more image frames. Here, the graphics state is information that is required for rendering the objects specified by the draw command. For example, the graphics state includes source data such as coordinates, texture, and camera view information of a certain object.

Also, the graphics state potentially includes information used for each unit of the GPU 120 to perform its rendering operation according to the draw command. As an example of such information, graphics state 1 means graphics information used by the vertex shader in the GPU 120, and graphics state 2 means graphics information used by the rasterizer in the GPU 120. Because the graphics states are required for performing the rendering in response to each draw command, the hierarchical state generator 110 accordingly generates and manages the draw commands and graphics states that correspond to each of the draw commands. In other words, the hierarchical state generator 110 generates and manages a plurality of draw commands for rendering at least one image frame and a plurality of graphics states that correspond to each of the plurality of draw commands.

Figure 3:
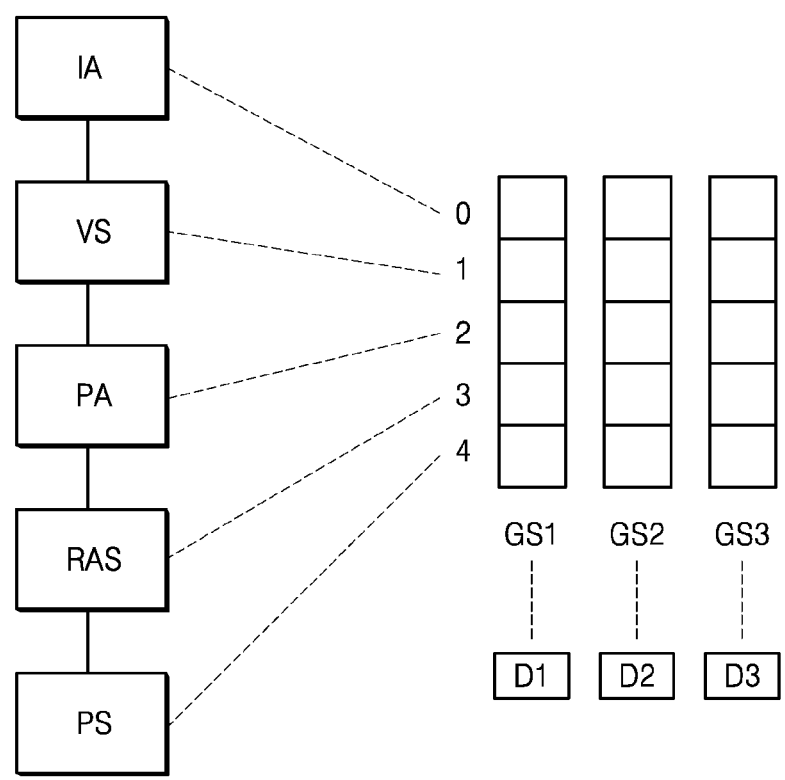
FIG. 3 illustrates an example of a plurality of draw commands for rendering at least one image frame and a plurality of graphics states that respectively correspond to the plurality of draw commands.

FIG. 3 illustrates an example of the plurality of draw commands for rendering at least one image frame and the plurality of graphics states that correspond to each of the plurality of draw commands.

In the example of FIG. 3, the hierarchical state generator 110 generates and manages a first draw command D1, a second draw command D2, and a third draw command D3 for rendering a certain image frame. The three draw commands shown in FIG. 3 are presented merely as examples, and the number of draw commands is not limited thereto.

The hierarchical state generator 110 generates and manages first graphics states GS1 corresponding to the first draw command D1, second graphics states GS2 corresponding to the second draw command D2, and third graphics states GS3 corresponding to the third draw command D3. In this example, each of the first through third graphics states GS1-GS3 includes graphics state 0, graphics state 1, graphics state 2, graphics state 3, and graphics state 4. However, the graphics states 0 through 4 in FIG. 3 are shown merely as examples, and the number of graphics states is not to be limited thereto.

In an embodiment, the graphics states 0 through 4 included in each of the first through third graphics states GS1-GS3 potentially include graphics information required by a input assembly IA, the vertex shader VS, the primitive assembly PA, the rasterizer RAS, and a primitive shader PS of the graphics pipeline during a rendering process for respective individual commands of the first through third draw commands D1-D3. The five units of the graphics pipeline in the example of FIG. 3 are shown merely as examples, and the number of units is not limited thereto. Also, the sequence of the units in the graphics pipeline and the corresponding graphics states is not limited to the example shown in the example of FIG. 3. Furthermore, although the graphics states are expressed in FIG. 3 in terms of the units in the graphics pipeline, the graphics states are alternatively expressed in terms of a page.

Referring back to the example of FIG. 2, the hierarchical state generator 110 analyzes a plurality of draw commands and a plurality of graphics states for rendering at least one image frame, and generates hierarchical graphics states based on the graphics states that are common to the plurality of draw commands.

According to an embodiment, the hierarchical state generator 110 analyzes a plurality of draw commands and a plurality of graphics states, each of which corresponds to respective one of the plurality of draw commands. When the plurality of draw commands changes sequentially, the hierarchical state generator 110 detects unchanged graphics states as graphics states common to the plurality of draw commands. For example, assuming that graphics state 0 and graphics state 3 are unchanged when the first draw command is changed to the second draw command, the hierarchical state generator 110 detects the graphics states 0 and 3 as the graphics states common to the first and second draw commands. Also, the hierarchical state generator 110 determines at least one graphics state common to the plurality of draw commands as an image state.

The hierarchical state generator 110 determines, based on the image state, a plurality of draw states, each of which corresponds to respective one of the plurality of the draw commands. According to an example, the hierarchical state generator 110 determines graphics states other than the image state among the graphics states that correspond to one of the plurality of the draw commands as the plurality of draw states for the corresponding draw command. Accordingly, the hierarchical state generator 110 generates the image state and the plurality of draw states, both of which are the hierarchical graphics states, from the plurality of graphics states in a unit of frames. Also, the hierarchical state generator 110 potentially generates the image state and the plurality of draw states, both being the hierarchical graphics states, from the plurality of graphics states in a unit of two or more frames. More embodiments are described below with reference to FIG. 4.

FIG. 4 illustrates an embodiment of generating the hierarchical graphics states performed by the hierarchical state generator 110. Although FIG. 4 and the following description focus on the generation of the hierarchical graphics states with respect to a single frame for simplicity, other embodiments are applicable to the generation of the hierarchical graphics states for two or more frames.

The hierarchical state generator 110 analyzes first through third draw commands D1-D3 and analyzes first through third graphics states GS1-GS3 for rendering a certain frame.

First, the hierarchical state generator 110 initialize a state vector to '00000.' Assuming in this example that the first graphics states GS1 corresponding to the first draw command D1 differs from an initial state in terms of the graphics states 1 and 3, the hierarchical state generator 110 detects the difference in the graphics states and then changes the state vector from '00000' into '01010.' As a result, the changed bits correspond to the different graphics states. Further assuming that the second graphics states GS2 corresponding to the second draw command D2 differs from the first graphics states GS1 in terms of the graphics state 3, the hierarchical state generator 110 detects the difference in the graphics states and maintains the state vector of '01010.' Further assuming that the third graphics states GS3 corresponding to third draw command D3 differ from the second graphics states GS2 in terms of the graphics states 2 and 3, the hierarchical state generator 110 detects the difference in the graphics states and changes the state vector from '01010' into '01110.' The hierarchical state generator 110 determines, based on the state vector '01110,' that the graphics states 0 and 4 are unchanged, and designate graphics states 0 and 4 as the image state IS.

Subsequently, the hierarchical state generator 110 designate the graphics states 1 through 3 that remain after excluding the image state from the first graphics states GS1 as a first draw state DS1. For example, the hierarchical state generator 110 designates the graphics states 1 through 3 that remain, after excluding the image state from the second graphics states GS2, as a second draw state DS2. The hierarchical state generator 110 determines the graphics states 1 through 3 that remain after excluding the image state from the third graphics states GS3 as a third draw state DS3.

Thus, the hierarchical state generator 110 generates the hierarchical graphics states including the image state IS and the first through third draw states DS1-DS3 from the first through third graphics states GS1-GS3, each of which corresponds to a respective one of the first through third draw commands D1-D3.

Meanwhile, the hierarchical state generator 110 shown in the example of FIG. 2 generates the hierarchical graphics states for each pass to perform multi-pass rendering of the image frame. That is, the hierarchical state generator 110 generates the hierarchical graphics states for each pass from the plurality of graphics states that are specified for each pass. For example, the hierarchical state generator 110 generates the hierarchical graphics states for a binning pass and the hierarchical graphics states for a rendering pass.

FIGS. 5A-5B illustrate an embodiment of generating the hierarchical graphics states, performed by a hierarchical state generator 110, for each pass to perform the multi-pass rendering. Although the examples of FIGS. 5A-5B and the following description are presented in terms of the binning pass and the rendering pass, the description is applicable to the other kinds of passes as well in terms of explanation.

In the examples of FIGS. 5A-5B, it is assumed that the rendering process for the rendering pass requires the functions of the input assembly IA, the vertex shader VS, the primitive assembly PA, the rasterizer RAS, and the primitive shader PS of the graphics pipeline. Accordingly, the hierarchical state generator 110 generates the hierarchical graphics states IS and DS1-DS3 from the plurality of graphics states GS1-GS3 for the rendering pass.

In the example of the binning pass, it is assumed that the rendering process requires the functions of the input assembly IA, the vertex shader VS, and the primitive assembly PA of the graphics pipeline. Accordingly, the hierarchical state generator 110 generates the hierarchical graphics states IS' and DS1'-DS3' from the plurality of graphics states GS1'-GS3' for the binning pass. It is to be noted that the graphics states GS1-GS3 and GS1'-GS3' are presented merely as examples, and the number of graphics states is not limited thereto in various embodiments.

Referring back to the example of FIG. 2, the hierarchical state generator 110 transmits the plurality of draw commands and the hierarchical graphics states for each image frame to the GPU 120. Also, the hierarchical state generator 110 transmits, to he GPU 120, the hierarchical graphics states generated with respect to each of the passes for multi-pass rendering, according to an embodiment.

As described above, the hierarchical state generator 110 transmits, to the GPU 120, the hierarchical graphics states including the image states and the plurality of draw states instead of the entire information of the plurality of graphics states for the plurality of draw commands. In an example, the transmission of only the information of the changed graphics states reduces memory overhead caused by the transmission of the graphics states information to a memory of the GPU 120 because only the relevant subset of the information is transmitted and hence transmission requires fewer resources.

Figure 6:
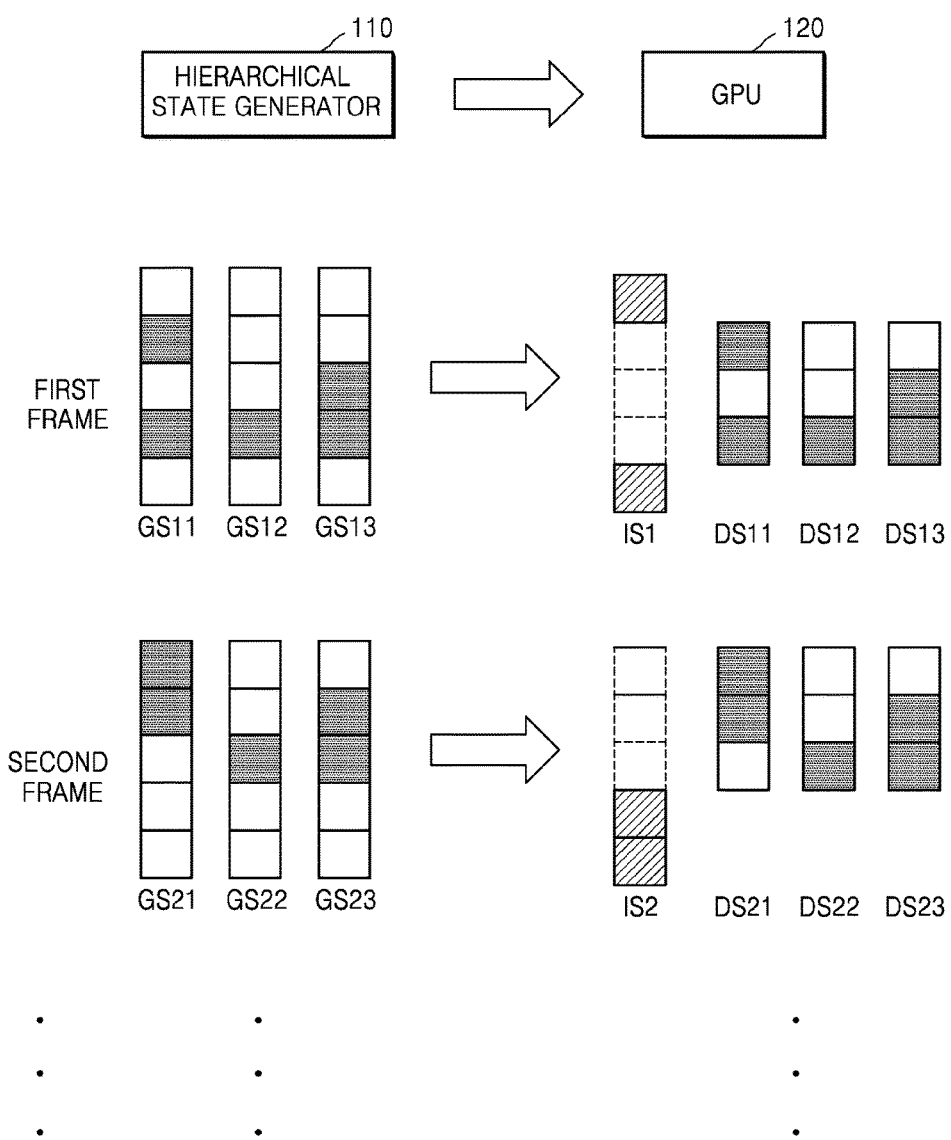
FIG. 6 illustrates an embodiment of transmission of the hierarchical graphics states corresponding to a plurality of draw commands from a hierarchical state generator to a graphics processing unit (GPU) for every image frame.

FIG. 6 illustrates an embodiment of transmitting the hierarchical graphics states corresponding to the plurality of draw states from the hierarchical state generator 110 to the GPU 120 for each image frame.

For example, according to the embodiment of FIG. 6, the hierarchical state generator 110 analyzes first through third graphics states GS11-GS13 corresponding to the first through third draw commands for rendering a first image frame to generate the hierarchical graphics states. That is, the hierarchical state generator 110 generates the hierarchical graphics states including an image state IS1 and first through third draw states DS11-DS13 from the first through third graphics states GS11-GS13. Thus, the hierarchical state generator 110 transmits, to the GPU 120, the hierarchical graphics states including the image state IS1 and the first through third draw states DS11-DS13 corresponding to the first through third draw commands.

According to an embodiment, the hierarchical state generator 110 transmits the hierarchical graphics states including the image state IS1 and the first through third draw states DS11-DS13 for the first image frame by providing the GPU 120 with state vectors for the image state IS1 and the first through third draw states DS11-DS13. For example, the hierarchical state generator 110 provides the GPU 120 with a state vector '10001' for the image state IS1 and state vectors '01010', '00010,' and '00110' for the first through third draw states DS11-DS13. As another example, the hierarchical state generator 110 transmits a state vector '01110' as corresponding to a certain range, namely the first through third draw states DS11-DS13 to the GPU 120.

For a second image frame, similar to the first image frame, the hierarchical state generator 110 analyzes first through third graphics states GS21-GS23 corresponding to the first through third draw commands in order to generate the hierarchical graphics states. That is, the hierarchical state generator 110 generates the hierarchical graphics states including an image state IS2 and first through third draw states DS21-DS23 from the first through third graphics states GS21-GS23. Thus, the hierarchical state generator 110 transmits, to the GPU 120, the hierarchical graphics states IS2 and DS21-DS23 that correspond to the first through third draw commands. Similarly, the hierarchical state generator 110 generates the hierarchical graphics states for the other frames in order to transmit the generated hierarchical graphics states to the GPU 120.

Referring back to the example of FIG. 2, the GPU 120 performs the rendering of the image frame based on the hierarchical graphics states received from the hierarchical state generator 110.

For example, the GPU 120 includes a state manager 122 and a graphics pipeline 124 according to an embodiment.

The state manager 122 sets the hierarchical graphics states received from the hierarchical state generator 110 to the graphics pipeline 124. In an embodiment, the state manager 122 sets the image state and the plurality of draw states sequentially to be used in the graphics pipeline 124.

In another embodiment, the state manager 122 first sets the image state to be used in the graphics pipeline 124, and then sets the plurality of draw states sequentially to be used in the graphics pipeline 124. According to such an embodiment, the state manager 122 determines whether the image state among the hierarchical graphics states received from the hierarchical state generator 110 has changed. Alternatively put, the state manager 122 determines whether a current image state has changed from the image state that was set previously. If the image state has not changed, the state manager 122 maintains the previous image state. If the image state has changed from the previous image state, the state manager 122 sets the current image state to be used in the graphics pipeline 124. Subsequently, the state manager 122 sets the plurality of draw states sequentially to be used in the graphics pipeline 124.

Thus, the graphics pipeline 124 performs the rendering of the image frame based on the hierarchical graphics states set by the state manager 122.

As described above, in an example, the GPU 120 first sets the image states that are common to the plurality of draw commands to the graphics pipeline 124, and then sets the plurality of draw states sequentially to the graphics pipeline 124. Because the GPU 120 gives priority to the image states that are common to the plurality of draw commands, the overhead occurring in setting and maintaining the graphics states to the graphics pipeline 124 is reduced.

Figure 7:
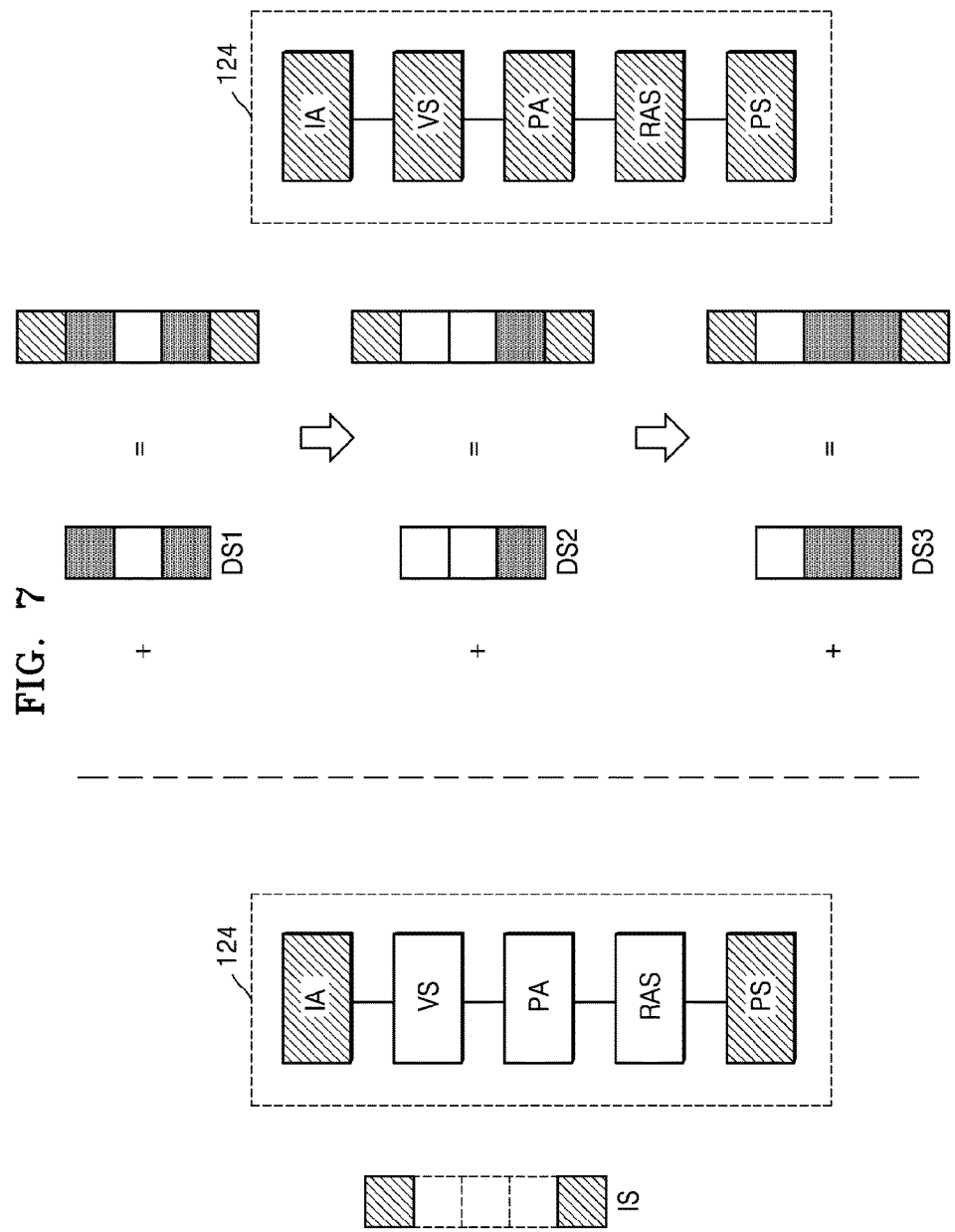
FIG. 7 illustrates an embodiment of setting hierarchical graphics states with respect to a graphics pipeline, performed by a state manager.

FIG. 7 illustrates an embodiment of setting the hierarchical graphics states to be used in the graphics pipeline 124, which is performed by the state manager 122.

The state manager 122 receives the hierarchical graphics states that correspond to the first through third draw commands for the first frame and include the image state IS and the plurality of draw states DS1-DS3.

For example, the state manager 122 first sets the image state IS to the graphics pipeline 124. Because the image state IS contains graphics information required by the input assembly IA and the primitive assembly PA in the graphics pipeline 124 according to the embodiment shown in FIG. 6, the state manager 122 sets the image states IS to the input assembly IA and the primitive assembly PA parts of the graphics pipeline 124.

Subsequently, the state manager 122 sets the plurality of draw states DS1-DS3 sequentially to be used in the graphics pipeline 124. Because the plurality of draw states DS1-DS3 contain information required by the vertex shader VS, the primitive assembly PA, and the rasterizer RAS in the graphics pipeline 124, the state manager 122 set the plurality of draw states DS1-DS3 sequentially to be used by the vertex shader VS, the primitive assembly PA, and the rasterizer RAS of the graphics pipeline 124. That is, the state manager 122 sets the first draw state DS1 additionally to be used in the graphics pipeline 124 set by the image state IS. Also, the state manager 122 sets the second draw state DS2 additionally to be used in the graphics pipeline 124 set by the image state IS. Furthermore, the state manager 122 sets the third draw state DS3 additionally to be used in the graphics pipeline 124 set by the image state IS.

Accordingly, the graphics pipeline 124 performs the rendering responsive to the first draw command on the image frame by using the image state IS and the first draw state D1 set by the state manager 122. Also, the graphics pipeline 124 performs the rendering responsive to the second draw command on the image frame by using the image state IS and the second draw state D2 set by the state manager 122. Furthermore, the graphics pipeline 124 performs the rendering responsive to the third draw command on the image frame by using the image state IS and the third draw state D3 as set by the state manager 122.

Figure 8:
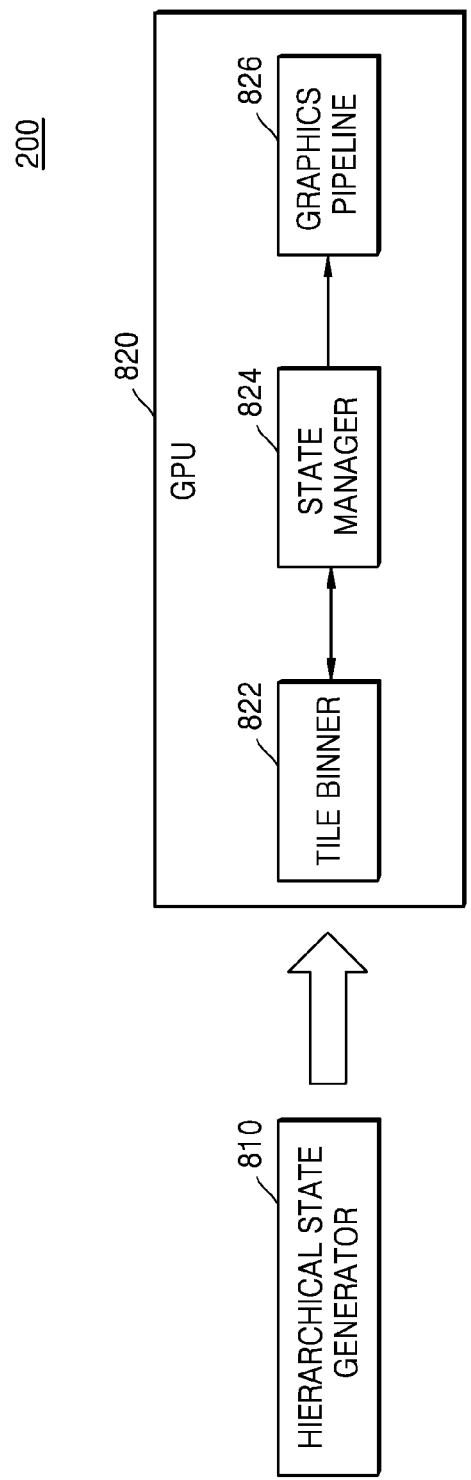
FIG. 8 is a block diagram of the rendering apparatus according to another embodiment.

FIG. 8 illustrates the rendering apparatus 200 according to another embodiment.

According to the example of FIG. 8, the rendering apparatus 200 includes a hierarchical state generator 810 and a GPU 820. Although the example of FIG. 8 shows only the elements that are necessary for the description of the embodiments, it is to be appreciated that the rendering apparatus 200 possibly further includes other appropriate elements in addition to or instead of those illustrated in FIG. 8.

The hierarchical state generator 810 and the GPU 820 are similar to the hierarchical state generator 110 and the GPU 120, respectively, as shown in the example of FIG. 2, and detailed descriptions of these elements are omitted for brevity.

For example, the GPU 820 according to such an embodiment performs tile-based rendering. The term 'tile-based rendering' refers to dividing or partitioning each image frame into a plurality of tiles and rendering each tile separately. The tile-based rendering architecture possibly uses less of a computational amount than the approach of image frame processing in pixel units, and is optionally employed for graphics rendering in mobile devices such as a smart phone and tablet device or embedded devices that have limited processing performance. In the descriptions below, it is to be noted that the expression 'rendering' of the GPU 820 includes the tile-based rendering, for simplicity.

For example, the GPU 820 includes a tile binner 822, a state manager 824, and a graphics pipeline 826. The state manager 824 and the graphics pipeline 826 are similar to the state manager 122 and the graphics pipeline 124, respectively, shown in FIG. 2, and detailed descriptions of them are not repeated for brevity.

For example, the tile binner 822 performs tile binning with respect to the image frame. Here, the tile binning is a process of dividing the image frame into tiles of a certain size and generating binning information that represents at least one of the tiles that each of the draw states corresponds to. In this example, the size of the divided tiles is possibly the same as or different from one another. For example, when the image frame includes an array of 800×600 pixels, the tile binner 822 divides the image frame into 10×10 tiles, so that each tile includes 80×60 pixels, according to the number of tiles and the number of pixels. Also, the tile binning is potentially a process of generating binning information that represents at least one of the tiles according to each of the plurality of draw commands that the image frame corresponds to. For example, in an example in which the first through third draw commands are performed for the first image frame, the binning information possibly represents information that the first and second draw commands are performed with respect to a first tile in the first image frame, and that the second and third draw commands are performed with respect to a second tile in the first image frame. In addition, in this example, the binning information represents that the first and second draw states that correspond to the first and second draw commands, respectively, are used for the rendering of the first tile.

Also, the tile binner 822 performs the tile binning for the image frame based on the image state and the plurality of draw states as set by the state manager 824.

According to an embodiment, the state manager 824 determines, based on the binning information, a tile state for a certain tile in the image frame. That is, the state manager 824 determines one or more graphics states that are commonly contained in draw states corresponding to the certain tile as the tile states. Also, the state manager 824 determines, based on the tile state, tile draw states, each of which corresponds to one of the draw states. More specifically, the state manager 824 determines graphics states other than the tile state among the draw states corresponding to the certain tile as tile draw states. As a result, the state manager 824 determines the tile state and the tile draw states from among the draw states corresponding to the certain tile.

Figure 9:
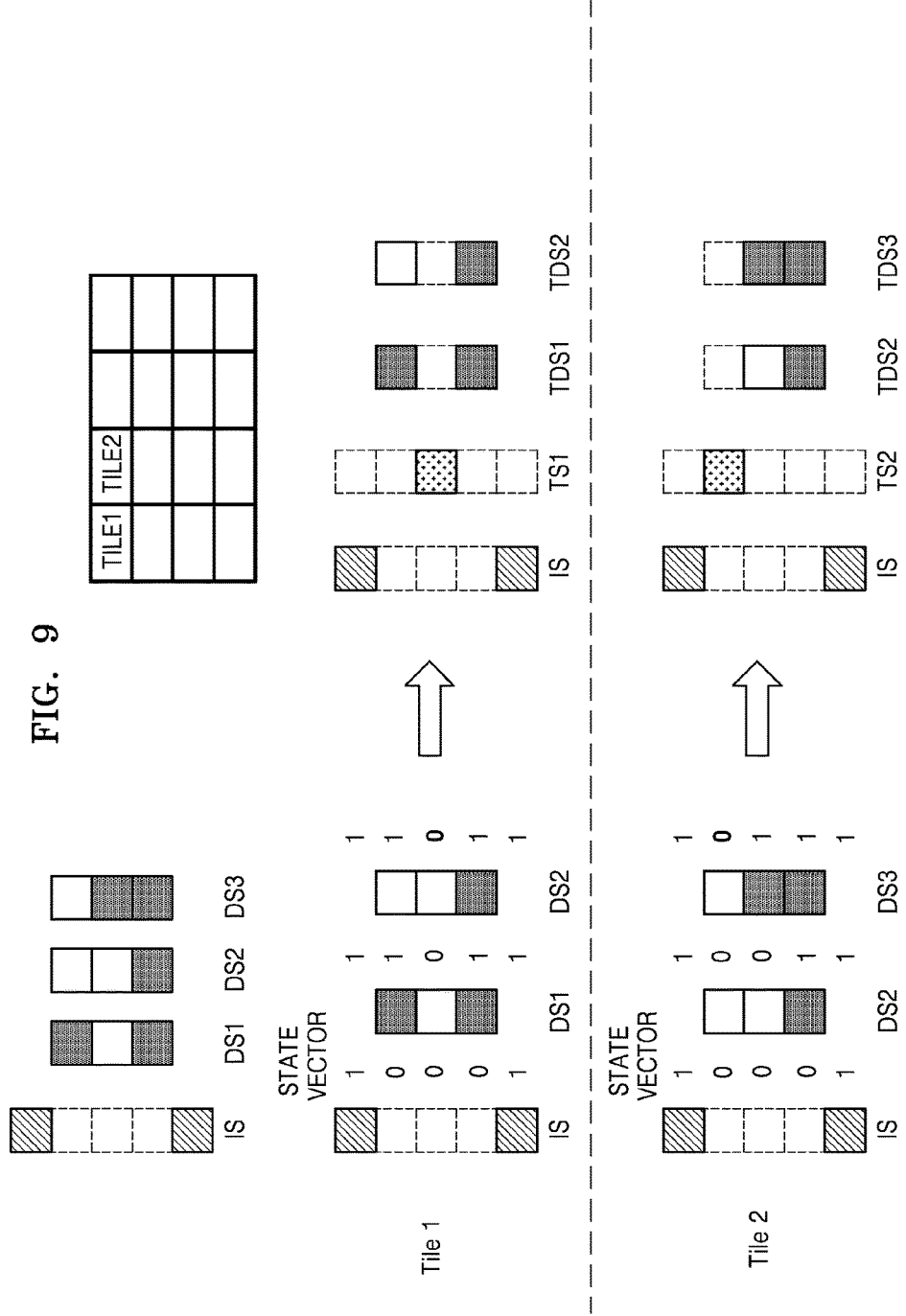
FIG. 9 illustrates an embodiment of determining a tile state and tile draw states from among draw states corresponding to a tile, which is performed by a state manager.

FIG. 9 illustrates an embodiment of determining the tile state and the tile draw states from among the draw states corresponding to a tile, which is performed by the state manager 824.

For example, the state manager 824 recognizes, based on the binning information, that the first draw state DS1 and the second draw state DS2 correspond to the first tile TILE1 of a certain image frame. Also, the state manager 824 recognizes, based on the binning information, that the second draw state DS2 and the third draw state DS3 correspond to the second tile TILE2 of the certain image frame.

For the first tile TILE1, the state manager 824 determines one or more graphics states that are commonly contained in the first draw state DS1 and the second draw states DS2. To be more specific, the state manager 824 sets the initial state vector to '10001' based on the image state IS. Assuming that the first draw state DS1 differs in the graphics states 1 and 3 from the initial state vector, the state manager 824 detects the difference in the graphics states and changes the state vector from '10001' into '11011.' Further assuming that the second draw state DS2 differs in the graphics state 3 from the second draw state DS1, the state manager 824 detects the difference in the graphics states and maintains the state vector of '11011.' Hence, the state manager 824 determine the graphics state 2 that is common to the first draw state DS1 and the second draw state DS2, based on the state vector '11011,' as the tile state TS1. Subsequently, the state manager 824 determines the graphics states 1 and 3 that remain after excluding the tile state TS1 from the first draw state DS1 as a first tile draw states TDS1. Also, the state manager 824 determines the graphics states 1 and 3 that remain after excluding the tile state TS1 from the second draw state DS2 as second tile draw states TDS2.

Similarly, for the second tile TILE2, the state manager 824 determines the graphics state 1 that is commonly contained in the second draw state DS2 and the third draw state DS3 as the tile state TS2. Also, the state manager 824 determines the graphics states 2 and 3 that remain after excluding the tile state TS2 from the second draw state DS2 as a second tile draw states TDS2, and determines the graphics states 2 and 3 that remain after excluding the tile state TS2 from the third draw state DS3 as a third tile draw state TDS3.

Thus, the state manager 824 shown in the example of FIG. 8 sets the image state, the tile state, and the tile draw states sequentially to the graphics pipeline 826. According to an embodiment, the state manager 824 first sets the image state to be used by the graphics pipeline 826. Subsequently, the state manager 824 sets the tile state to be used by the graphics pipeline 826. Afterwards, the state manager 824 set the tile draw states sequentially to be used by the graphics pipeline 826. To be more specific, the state manager 824 determines whether the current image state is the same as the previous image state. If the image state has not changed, the state manager 824 maintains the previous image state. If the image state has changed, the state manager 824 sets the current image state to be used by the graphics pipeline 824. Next, the state manager 824 determines whether the current tile state is the same as the tile state that was set previously. If the tile state has not changed, the state manager 824 maintains the previous tile state. If the tile state has changed, the state manager 824 sets the current tile state to be used by the graphics pipeline 824. Subsequently, the state manager 824 sets the tile draw states sequentially to be used by the graphics pipeline 826.

In this example, the graphics pipeline 826 performs the rendering of the tile based on the image state, the tile state, and the tile draw states.

Figure 10:
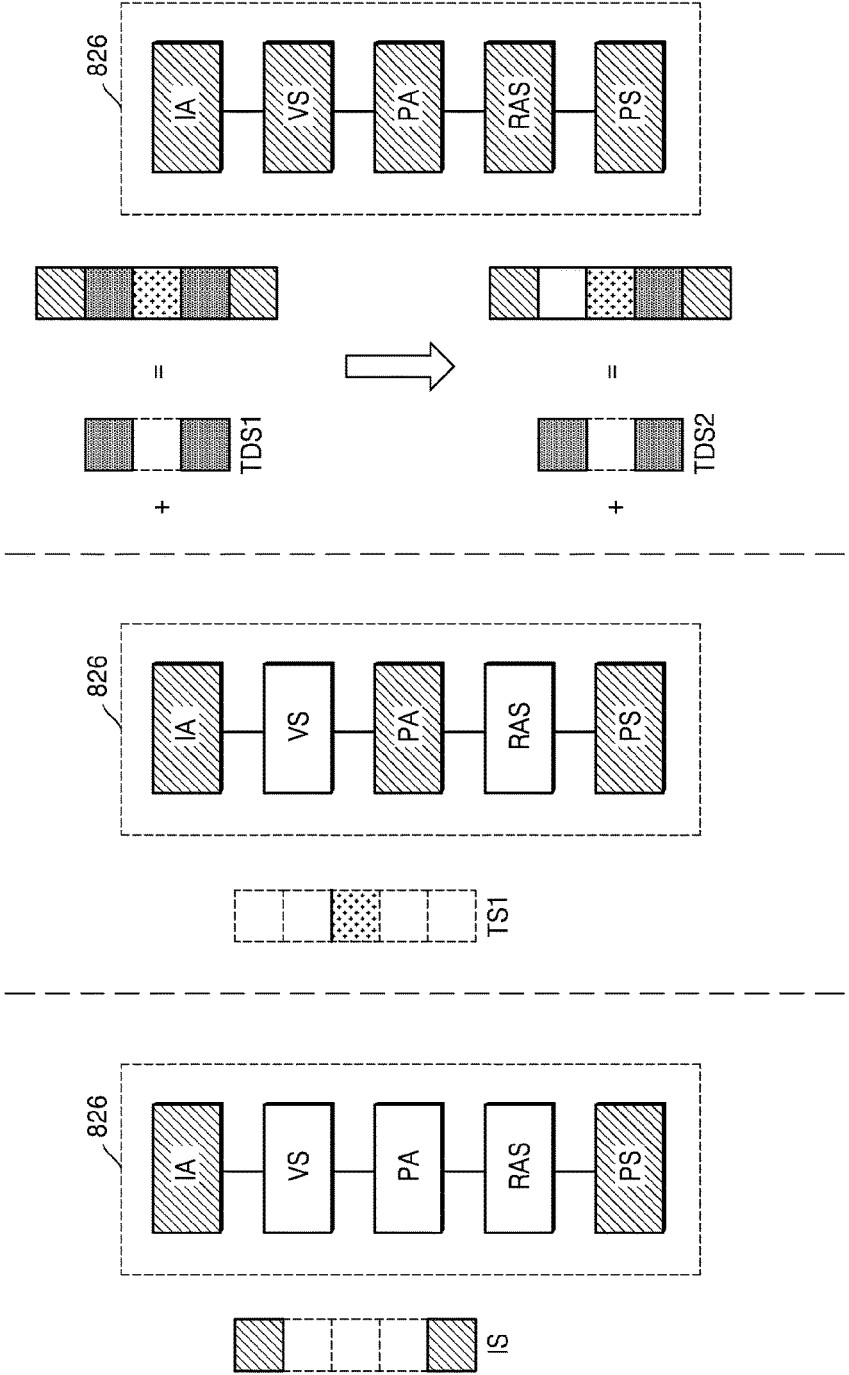
FIG. 10 illustrates an embodiment of setting an image state, a tile state, and tile draw states to the graphics pipeline, performed by a state manager.

FIG. 10 illustrates an embodiment of setting the image state, the tile state, and the tile draw states to be used by the graphics pipeline 826 performed by the state manager 824.

For example, the state manager 824 set, to be used by the graphics pipeline 826, the image state IS, the tile state TS1, and the tile draw states TDS1 and TDS2 that correspond to the first and second draw commands for the first tile in the first image frame.

More specifically, in this example, the state manager 824 first sets the image state IS to be used by the graphics pipeline 826. Because the image state IS contains graphics information that is required by the input assembly IA and the primitive assembly PA in the graphics pipeline 826 according to the embodiment shown in FIG. 10, the state manager 824 sets the image states IS to the input assembly IA and the primitive assembly PA of the graphics pipeline 826.

Subsequently, the state manager 824 additionally sets the tile state TS1 to be used by the graphics pipeline 826. Because the tile state TS1 contains graphics information required by the primitive assembly PA in the graphics pipeline 826 according to the embodiment shown in FIG. 10, the state manager 824 sets the tile state TS1 to the primitive assembly PA of the graphics pipeline 826. That is, the state manager 824 also sets the tile state TS1 to the primitive assembly PA of the graphics pipeline 826 that is set by the image state IS.

Afterwards, the state manager 824 sets the tile draw states TDS1 and TDS2 sequentially to be used by the graphics pipeline 826. Because the tile draw states TDS1 and TDS2 contain information required by the vertex shader VS and the rasterizer RAS in the graphics pipeline 826, the state manager 824 sets the tile draw states TDS1 and TDS2 sequentially to be used by the vertex shader VS and the rasterizer RAS of the graphics pipeline 826. That is, the state manager 824 sets the tile draw state TDS1 additionally to be used by the graphics pipeline 826 as set by the image state IS and the tile state TS1. Also, the state manager 824 potentially sets the tile draw state TDS2 additionally to be used by the graphics pipeline 826 as set by the image state IS and the tile state TS1.

Accordingly, the graphics pipeline 826 performs the rendering that is responsive to the first draw command on the first tile by using the image state IS, the tile state TS1, and the tile draw state TDS1 as set by the state manager 824. Also, the graphics pipeline 826 performs the rendering responsive to the second draw command on the first tile by using the image state IS, the tile state TS1, and the tile draw state TDS2 as set by the state manager 824.

Figure 11:
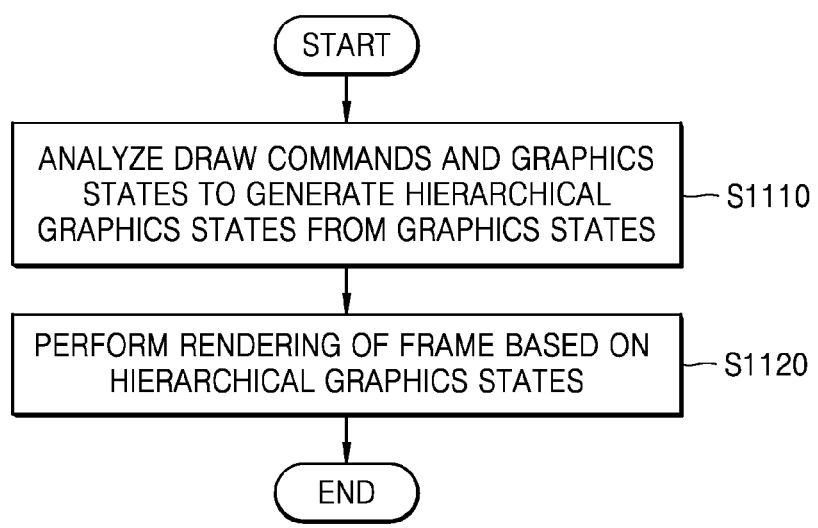
FIG. 11 is a flowchart illustrating a rendering method performed by a rendering apparatus using hierarchical graphics states according to an embodiment.

FIG. 11 is a flowchart illustrating a rendering method using the hierarchical graphics states according to an embodiment. For example, the method shown in the example of FIG. 11 is performed by the rendering apparatus 100 of FIG. 2, and repetitive descriptions are omitted for brevity.

In operation S1110, the rendering apparatus 100 analyzes the plurality of draw commands and the plurality of graphics states for rendering at least one image frame, and generates hierarchical graphics states based on at least one graphics state that is common to the plurality of draw commands.

According to an embodiment, the rendering apparatus 100 analyzes the graphics API received from an application to generate the draw commands and the graphics states that are to be processed by the GPU. The draw command is a command that specifies one or more objects to be rendered in a certain frame. In an embodiment, the draw command is expressed by a draw call. For example, the graphics state is information that is required by the units in the GPU for rendering the objects in response to the draw command.

Next, the rendering apparatus 100 analyzes the plurality of draw commands and the plurality of graphics states, each of which corresponds to a respective single draw command of the plurality of draw commands. When the plurality of draw commands change sequentially, the rendering apparatus 100 detects unchanged graphics states as graphics states common to the plurality of draw commands. Also, the rendering apparatus 100 determines at least one graphics state common to the plurality of draw commands as the image state.

Subsequently, the rendering apparatus 100 determines, based on the image state, the draw states, each of which corresponds to a respective single draw command of the plurality of the draw commands. According to an embodiment, the rendering apparatus 100 determines graphics states other than the image state among the graphics states that correspond to one of the draw commands, as the plurality of draw states for the corresponding draw command. As a result, the rendering apparatus 100 generates the image state and the plurality of draw states, both of which are the hierarchical graphics states, from the plurality of graphics states in a frame unit.

Also, the rendering apparatus 100 generates the hierarchical graphics states for each pass to perform the multi-pass rendering of the image frame. That is, the rendering apparatus 100 generates the hierarchical graphics states for each pass from the plurality of graphics states that are specified for each pass. For example, the rendering apparatus 100 generates the hierarchical graphics states for the binning pass and the hierarchical graphics states for the rendering pass.

In operation S1120, the rendering apparatus 100 performs the rendering of the image frame based on the hierarchical graphics states.

According to an embodiment, the rendering apparatus 100 sets the hierarchical graphics states to be used by the graphics pipeline in the rendering apparatus 100. Specifically, the rendering apparatus 100 sets the image state and the plurality of draw states sequentially to the graphics pipeline.

According to another embodiment, in operation S1110 the rendering apparatus 100 first sets the image state to be used by the graphics pipeline, and then sets the draw states sequentially to be used by the graphics pipeline. According to an embodiment, the rendering apparatus 100 determines whether the image state among the hierarchical graphics states received from the hierarchical state generator 110 has changed. In other words, the rendering apparatus 100 determines whether a current image state has changed from the image state set previously. If the image state has not changed, the rendering apparatus 100 maintains the previous image state. If the image state has changed from the previous image state, the rendering apparatus 100 sets the current image state to be used by the graphics pipeline. Subsequently, the rendering apparatus 100 sets the draw states sequentially to be used by the graphics pipeline.

In operation S1120, the graphics pipeline in the rendering apparatus 100 performs the rendering of the image frame based on the hierarchical graphics states.

Figure 12:
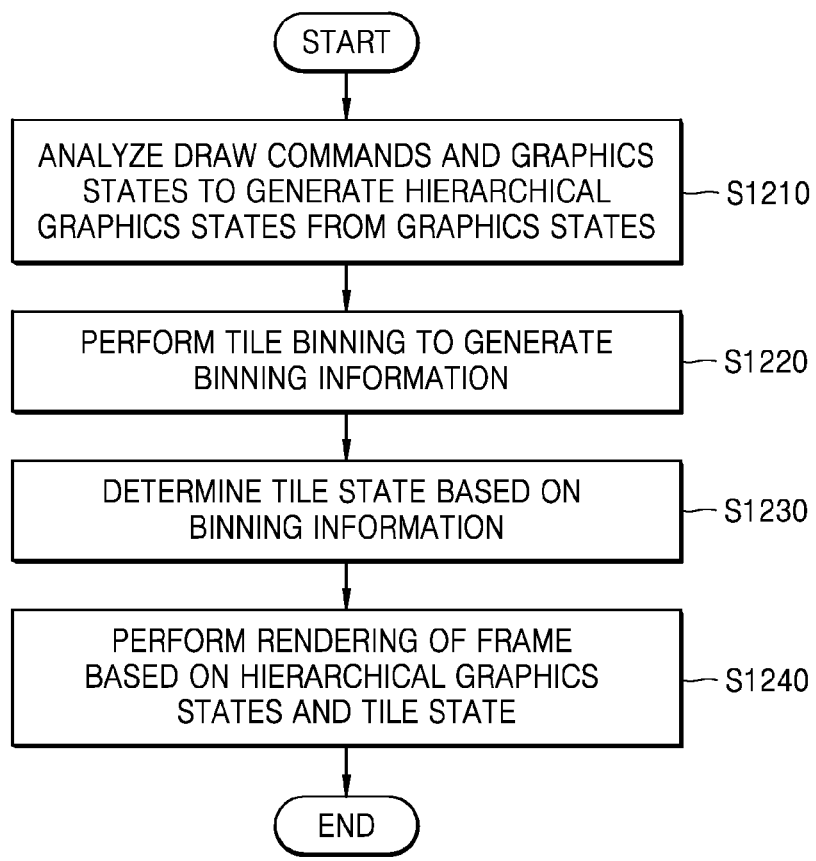
FIG. 12 is a flowchart illustrating a tile-based rendering method performed by a rendering apparatus using hierarchical graphics states according to an embodiment.

FIG. 12 illustrates a tile-based rendering method performed by the rendering apparatus 200 using the hierarchical graphics states according to an embodiment. The method shown in FIG. 12 is potentially performed by the rendering apparatus 200 of FIG. 8, and repetitive descriptions are omitted.

In operation S1210, the rendering apparatus 200 analyzes the draw commands and the graphics states for rendering the image frame, and generates hierarchical graphics states based on at least one graphics state that is common to the draw commands. Operation S1210 shown in FIG. 12 is similar to operation S1110 of FIG. 11, and detailed descriptions thereof are not repeated.

In operation S1220, the rendering apparatus 200 performs tile binning with respect to the image frame and generates the binning information. The tile binning is a process of dividing the image frame into tiles of a certain size and includes generating binning information that represents at least one of the tiles that each of the plurality of draw commands corresponds to. For example, in case that the first through third draw commands are performed for the first image frame, the binning information represents information that the first and second draw commands are performed with respect to the first tile in the first image frame, and that the second and third draw commands are performed with respect to the second tile in the first image frame. In addition, the binning information potentially represents that the first and second draw states corresponding to the first and second draw commands, respectively, are to be used for the rendering of the first tile.

In operation S1230, the rendering apparatus 200 determines, based on the binning information, the tile state for a certain tile in the image frame. Also, the rendering apparatus 200 determines, based on the tile state, tile draw states, each of which corresponds to one of the draw states. More specifically, the rendering apparatus 200 determines graphics states other than the tile state from among the draw states corresponding to the certain tile as the tile draw states. Accordingly, the rendering apparatus 200 determines the tile state and the tile draw states from among the draw states corresponding to the certain tile.

In operation S1240, the rendering apparatus 200 performs the rendering with respect to the tile based on the hierarchical graphics states and the tile states.

First, the rendering apparatus 200 sets the image state, the tile state, and the tile draw states sequentially to be used by the graphics pipeline in the rendering apparatus 200. According to an embodiment, the rendering apparatus 200 first sets the image state to be used by the graphics pipeline. Subsequently, the rendering apparatus 200 sets the tile state to be used by the graphics pipeline. Afterwards, the rendering apparatus 200 sets the tile draw states sequentially to be used by the graphics pipeline. More specifically, the rendering apparatus 200 determines whether the current image state is the same as the previous image state. If the image state has not changed, the rendering apparatus 200 maintains the previous image state. If the image state has changed, the rendering apparatus 200 sets the current image state to the graphics pipeline. Next, the rendering apparatus 200 determines whether the current tile state is the same as the tile state that was set previously. If the tile state has not changed, the rendering apparatus 200 maintains the previous tile state. If the tile state has changed, the rendering apparatus 200 sets the current tile state to be used by the graphics pipeline. Subsequently, the rendering apparatus 200 sets the tile draw states sequentially to be used by the graphics pipeline.

Accordingly, the graphics pipeline in the rendering apparatus 200 performs the rendering of the tile based on the image state, the tile state, and the tile draw states.

The apparatuses, units, modules, devices, and other components illustrated in FIGS. 1-12 that perform the operations described herein with respect to FIGS. 1-12 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-12. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described herein with respect to FIGS. 1-12 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rendering apparatus, comprising:
a hierarchical state generator configured to analyze draw commands of at least one image frame and graphics states for rendering the at least one image frame, and to generate therefrom hierarchical graphics states comprising a first hierarchical graphics state comprised of at least one graphics state common to the draw commands, and second hierarchical graphics states which are draw states each corresponding to a respective one of the draw commands, each differing from the first hierarchical graphics states; and
a graphics processing unit (GPU) configured to render the at least one image frame based on the hierarchical graphics states;
wherein the GPU is further configured to render the at least one image frame using a plurality of graphics pipeline stages of a graphics pipeline, the first hierarchical graphics state is an image state comprised of at least one graphics state associated with at least one of the graphics pipeline stages, and each of the draw states is comprised of graphics states that are each associated with remaining ones of the graphics pipeline stages.

2. The rendering apparatus of claim 1, wherein the GPU comprises:
a state manager configured to set the image state and the draw states to be used by the graphics pipeline, wherein the graphics pipeline is configured to render the at least one image frame based on the image state and the draw states set by the state manager.

3. The rendering apparatus of claim 2, wherein the state manager sets the draw states to be used sequentially by the graphics pipeline after setting the image state to be used by the graphics pipeline.

4. The rendering apparatus of claim 1, wherein the CPU comprises:

a tile binner configured to divide the at least one image frame into tiles and to generate binning information representing which tiles among the tiles correspond to each of the draw states;
a state manager configured to determine a graphics state contained commonly in draw states corresponding to a predetermined tile as a tile state based on the binning information; and
the graphics pipeline is configured to render the predetermined tile based on the hierarchical graphics states and the tile state.

5. The rendering apparatus of claim 4, wherein the state manager is configured to determine, based on the tile state, tile draw states containing graphics states other than those of the tile state, the tile draw states being respective ones of the draw states corresponding to the predetermined tile, and to set the image state, the tile state, and the tile draw states to be used by the graphics pipeline.

6. The rendering apparatus of claim 5, wherein the state manager is configured to set the tile draw states to be used sequentially by the graphics pipeline after sequentially setting the image state and the tile state to be used by the graphics pipeline.

7. The rendering apparatus of claim 1, wherein the hierarchical state generator is configured to generate the hierarchical graphics states for every rendering pass for a multi-pass rendering of the at least one image frame, and
wherein the GPU is configured to perform the multi-pass rendering of the at least one image frame based on the hierarchical graphics states generated for each rendering pass.

8. The rendering apparatus of claim 1, wherein the hierarchical state generator is configured to provide the GPU with the hierarchical graphics states by using a state vector.

9. The rendering apparatus of claim 1, wherein the graphics pipeline stages comprise an input assembly (IA), a vertex shader (VS), a primitive assembly (PA), a rasterizer (RAS) and a primitive shader (PS), and the first hierarchical graphics state is comprised of a plurality of graphics states respectively used for at least two of the IA, the VS, the PA, the RAS and the PS.

10. The rendering apparatus of claim 1, wherein, for the rendering of the at least one image frame, the hierarchical state generator transmits to the GPU the first hierarchical graphics state and information of changed graphics states between the draw states, and refrains from transmitting remaining ones of the graphics states used for the rendering.

11. A rendering method, comprising:
analyzing draw commands and graphics states for rendering at least one image frame, and generating therefrom hierarchical graphics states comprising a first hierarchical graphics state comprised of at least one graphics state common to the draw commands, and second hierarchical graphics states which are draw states each corresponding to a respective one of the draw commands, each differing from the first hierarchical graphics state; and
rendering the at least one image frame based on the hierarchical graphics states,
wherein the rendering of the at least one image frame is performed using a plurality of graphics pipeline stages of a graphics pipeline, the first hierarchical graphics state is an image state comprised of at least one graphics state associated with at least one of the graphics pipeline stages, and each of the draw states is comprised of graphics states that are each associated with remaining ones of the graphics pipeline stages.

12. The rendering method of claim 11, wherein the rendering comprises:
setting the image state and the draw states to be used by the graphics pipeline; and
rendering the at least one image frame based on the image state and the draw states.

13. The rendering method of claim 12, wherein the setting comprises:
setting the draw states to be used sequentially by the graphics pipeline after setting the image state to be used by the graphics pipeline.

14. The rendering method of claim 11, wherein the rendering comprises:
dividing the at least one image frame into tiles and generating binning information representing which tiles among the tiles correspond to each of the draw states;
determining a graphics state contained commonly in draw states corresponding to a predetermined tile as a tile state based on the binning information; and
rendering the predetermined tile based on the hierarchical graphics states and the tile state.

15. The rendering method of claim 14, wherein the rendering of the predetermined tile comprises:
determining, based on the tile state, tile draw states containing graphics states other than those of the tile state, the tile draw states being respective ones of the draw states corresponding to the predetermined tile;
setting the image state, the tile state, and the tile draw states to be used by the graphics pipeline; and
rendering the predetermined tile based on the set image state, the set tile state, and the set tile draw states.

16. The rendering method of claim 15, wherein the setting the image state, the tile state, and the tile draw states to the graphics pipeline comprises:
setting the tile draw states to be used sequentially by the graphics pipeline after sequentially setting the image state and the tile state to be used by the graphics pipeline.

17. The rendering method of claim 11, wherein the generating the hierarchical graphics states comprises:
generating the hierarchical graphics states for every rendering pass to perform multi-pass rendering, and
wherein the rendering comprises
performing the multi-pass rendering of the at least one image frame based on the hierarchical graphics states generated for each pass.

18. The rendering method of claim 11, wherein the graphics pipeline stages comprise an input assembly (IA), a vertex shader (VS), a primitive assembly (PA), a rasterizer (RAS) and a primitive shader (PS), and the first hierarchical graphics state is comprised of a plurality of graphics states respectively used for at least two of the IA, the VS, the PA, the RAS and the PS.

19. A non-transitory computer-readable storage medium storing instructions for causing computing hardware to perform a rendering method comprising:
analyzing draw commands and graphics states for rendering at least one image frame, and generating therefrom hierarchical graphics states comprising a first hierarchical graphics states comprised of at least one graphics state common to the draw commands, and second hierarchical graphics states which are draw states each corresponding to a respective one of the draw commands, each differing from the first hierarchical graphics state; and
rendering the at least one image frame based on the hierarchical graphics states,
wherein the rendering of the at least one image frame is performed using a plurality of graphics pipeline stages of a graphics pipeline, the first hierarchical graphics state is an image state comprised of at least one graphics state associated with at least one of the graphics pipeline stages, and each of the draw states is comprised of graphics states that are each associated with remaining ones of the graphics pipeline stages.

* * * * *